United States Patent [19]
Hawk et al.

[11] Patent Number: 5,932,092
[45] Date of Patent: *Aug. 3, 1999

[54] FILTERING APPARATUS HAVING POSITIVELY BUOYANT AND NEGATIVELY BUOYANT PARTICULATE

[76] Inventors: William D. Hawk, 7417 Aurelia Rd., Oklahoma City, Okla. 73121; Gary D. Cryer, 316 E. 15th St., Chandler, Okla. 74834

[*] Notice: This patent is subject to a terminal disclaimer.

[21] Appl. No.: 08/988,344

[22] Filed: Dec. 10, 1997

Related U.S. Application Data

[63] Continuation-in-part of application No. 08/663,561, Jun. 13, 1996, Pat. No. 5,723,043.

[51] Int. Cl.[6] .............................. A01K 63/04; C02F 3/06
[52] U.S. Cl. ..................... 210/169; 210/277; 210/290; 210/287; 210/416.2; 119/260
[58] Field of Search .................... 210/108, 138, 210/169, 275, 277, 284, 283, 287, 290, 741, 786, 792, 793, 807, 416.2; 119/260

[56] References Cited

U.S. PATENT DOCUMENTS

| | | |
|---|---|---|
| 1,541,921 | 6/1925 | Caps . |
| 1,640,249 | 8/1927 | Perry . |
| 1,737,202 | 11/1929 | Runnels . |
| 2,466,662 | 4/1949 | Mindler . |
| 2,467,433 | 4/1949 | King . |
| 2,572,082 | 10/1951 | Welsh . |
| 3,260,366 | 7/1966 | Duff et al. . |
| 3,384,240 | 5/1968 | Berardi . |
| 3,424,674 | 1/1969 | Webber . |
| 3,471,025 | 10/1969 | Dobson ................................. 210/282 |
| 3,480,542 | 11/1969 | Bucksteeg et al. . |
| 3,616,915 | 11/1971 | Whitlock . |
| 3,814,245 | 6/1974 | Hirs ......................................... 210/74 |
| 3,814,247 | 6/1974 | Hirs ......................................... 210/80 |
| 3,956,128 | 5/1976 | Turner ..................................... 210/150 |
| 4,246,119 | 1/1981 | Alldredge ............................... 210/279 |
| 4,309,292 | 1/1982 | Stannard et al. . |
| 4,322,296 | 3/1982 | Fan et al. ................................ 210/610 |
| 4,519,917 | 5/1985 | Martinola ............................... 210/678 |
| 4,547,286 | 10/1985 | Hsiung . |
| 4,806,236 | 2/1989 | McCormack ............................. 210/94 |
| 5,198,124 | 3/1993 | Kim et al. . |
| 5,453,183 | 9/1995 | Hoffa ..................................... 210/169 |
| 5,516,434 | 5/1996 | Cairo, Jr. et al. . |

OTHER PUBLICATIONS

Purex Triton Swimming Pool Systems catalog pages showing various filters, copyright 1995, PAC–FAB, Inc. (5 pages).

*Primary Examiner*—Jay H. Woo
*Assistant Examiner*—Fred Prince
*Attorney, Agent, or Firm*—Dunlap, Codding & Rogers, P.C.

[57] ABSTRACT

An apparatus for filtering contaminated fluids is provided. In a filtering mode, contaminated fluid is introduced into a vessel housing a bed of positively buoyant particulate material and a bed of negatively buoyant particulate material in a spaced apart relationship. The contaminated fluid is passed through the bed of negatively buoyant particulate and through the bed of positively buoyant particulate. In a backwashing mode, a backwashing fluid is passed through the bed of positively buoyant particulate to flush particulate contaminants therefrom. The backwashing fluid is discharged from the vessel at a location between the bed of negatively buoyant particulate and the bed of positively buoyant particulate.

7 Claims, 9 Drawing Sheets

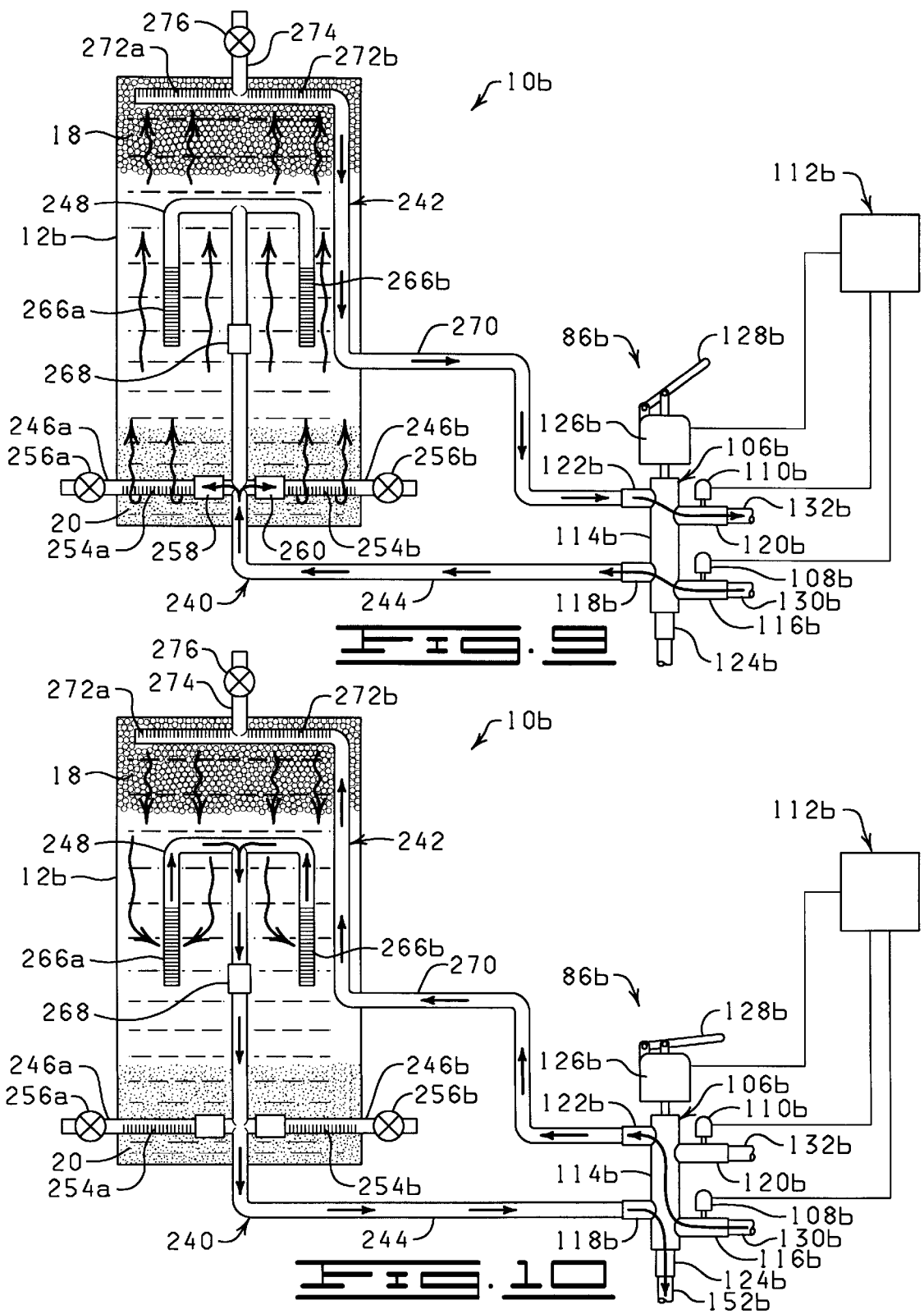

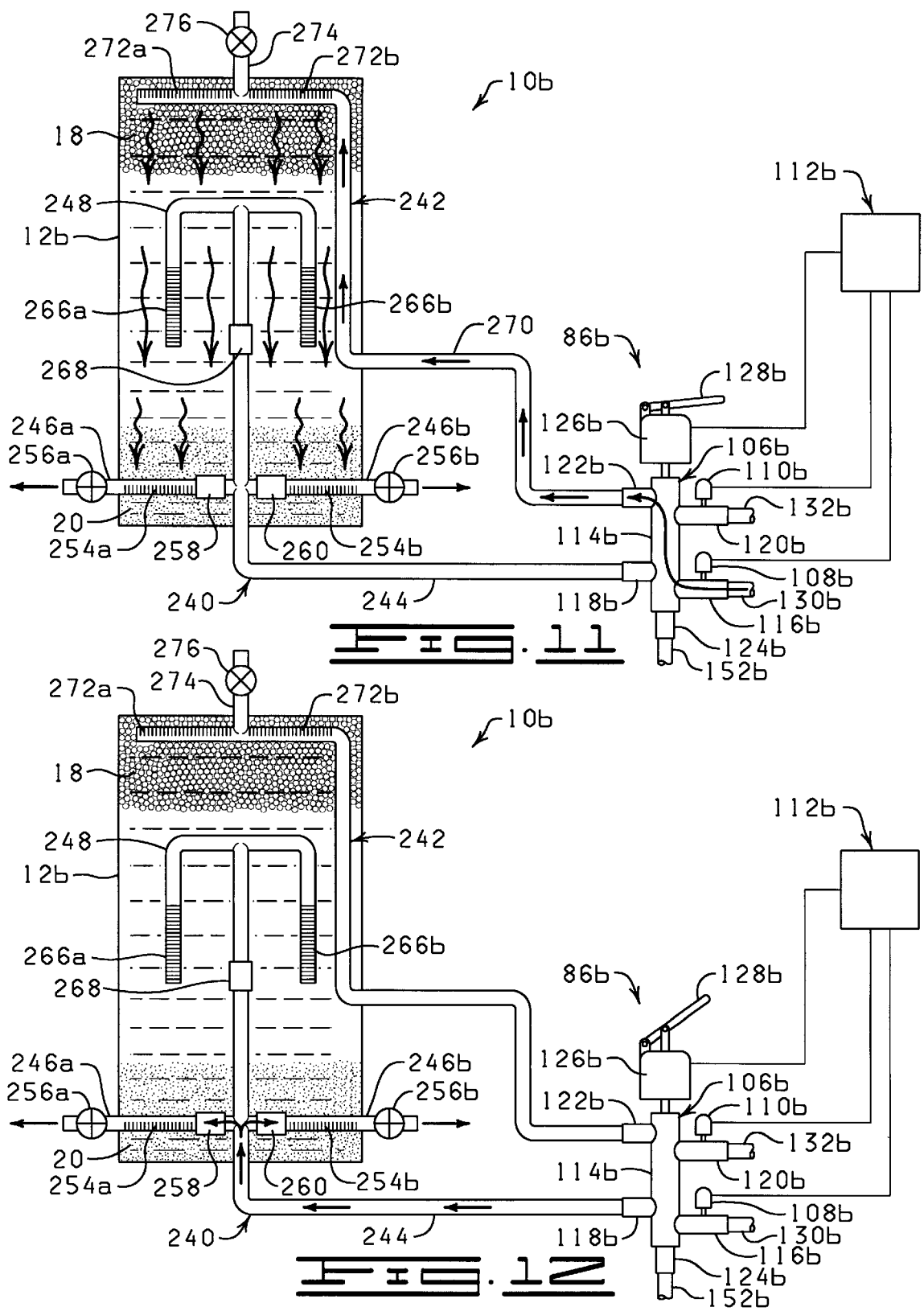

FILTERING APPARATUS HAVING POSITIVELY BUOYANT AND NEGATIVELY BUOYANT PARTICULATE

CROSS-REFERENCE TO RELATED APPLICATIONS

This application is a continuation-in-part of U.S. Ser. No. 08/663,561, filed Jun. 13, 1996 now U.S. Pat. No. 5,723,043.

STATEMENT REGARDING FEDERALLY SPONSORED RESEARCH OR DEVELOPMENT

Not applicable.

BACKGROUND OF THE INVENTION

1. Field of the Invention

The present invention relates generally to filtering systems, and more particularly, but not by way of limitation, to an improved apparatus and method for filtering contaminated fluid in fish tanks, aquariums, ponds, fountains, water treatment facilities, water purification devices and the like.

2. Brief Description of the Related Art

Many types of fluidized beds are known in the art. For example, U.S. Pat. No. 4,322,296 discloses a method for waste water treatment in a vessel having a fixed perforated plate and a movable perforated plate. A particulate carrier having a specific gravity greater than water is employed as the filtering medium within the vessel.

As a further example, U.S. Pat. No. 5,453,183 discloses a fluidized bed biological filter system for fish tanks. This system utilizes glass beads having a specific gravity greater than 1.5 times that of water as particulate media.

In these filtration systems, contaminated water is passed through a negatively buoyant particulate medium. Thus, these systems only accomplish one type of filtration, i.e., filtration through a particulate carrier having a specific gravity greater than water.

BRIEF SUMMARY OF THE INVENTION

A filtration system constructed in accordance with the present invention performs two types of filtration: (1) through a positively buoyant material, and (2) through a negatively buoyant material. The system includes a vessel, means for introducing contaminated liquid into the vessel, means for discharging filtered liquid out of the vessel, a bed of positively buoyant particulate disposed in the vessel and a bed of negatively buoyant particulate disposed in a spaced apart relationship relative to the bed of positively buoyant particulate.

One object of the present invention is to provide a filtration system which filters liquid through positively and negatively buoyant beds of particulate material.

A second object of the present invention is to provide a filtration system which is capable of filtering liquid flowing in either direction through the system.

A third object of the present invention is to provide a filtration system which is easily cleaned.

A fourth object of the present invention is to remove fine particulate contaminants suspended in the liquid to be filtered.

A fifth object of the present invention is to remove ammonia and nitrites dissolved in the liquid to be filtered through biological action of bacteria growing on the surface of the particulate filter media.

A sixth object of the present invention is to promote growth of bacteria to enhance biological filtration of the liquid to be filtered.

Other objects, features and advantages of the present invention will be apparent from the following detailed description when read in conjunction with the accompanying drawings and appended claims.

BRIEF DESCRIPTION OF THE SEVERAL VIEWS OF THE DRAWING

FIG. 9 is a diagrammatical view of the filtering apparatus of FIG. 8 operating in a filtering mode.

FIG. 10 is a diagrammatical view of the filtering apparatus of FIG. 8 operating in a primary backwash mode.

FIG. 11 is a diagrammatical view of the filtering apparatus of FIG. 8 operating in a secondary backwash mode.

FIG. 12 is a diagrammatical view of the filtering apparatus of FIG. 5 operating in a flush mode.

DETAILED DESCRIPTION OF THE INVENTION

Figure 1:
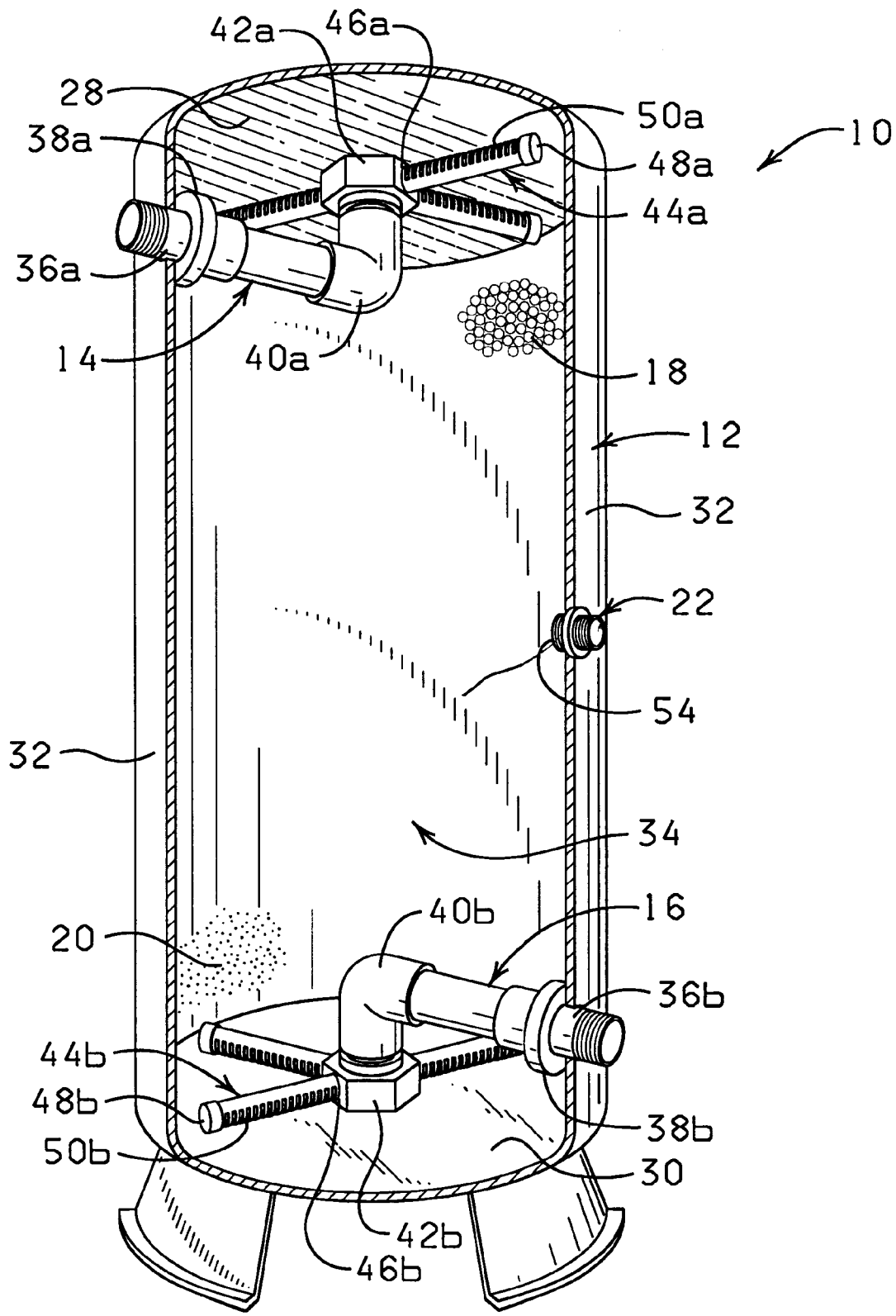
FIG. 1 is a partly cutaway, perspective view of a filtering apparatus constructed in accordance with the present invention.
Figure 2:
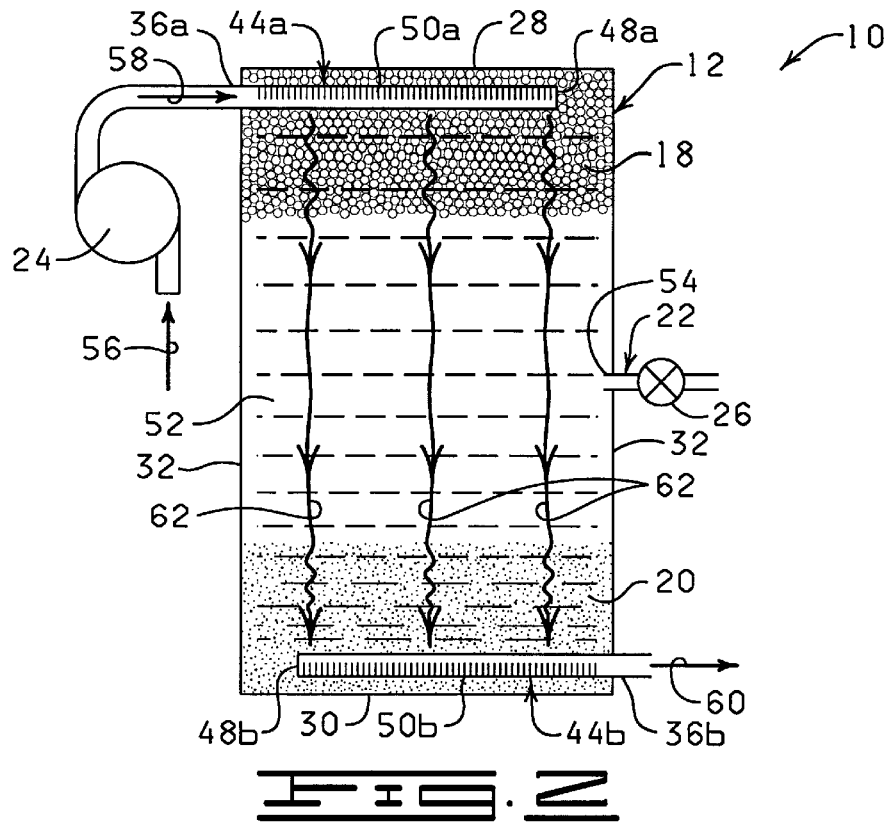
FIG. 2 is a diagrammatical view of the filtering apparatus of FIG. 1 operating in a downward flow filtering mode.
Figure 3:
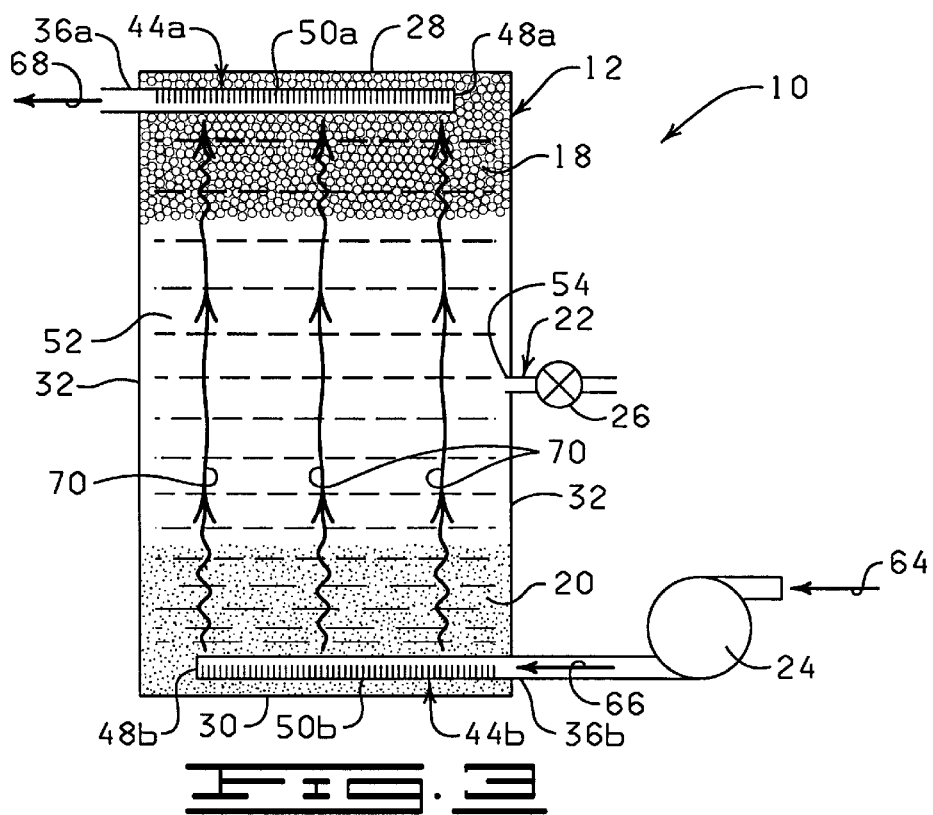
FIG. 3 is a diagrammatical view of the filtering apparatus of FIG. 1 operating in an upward flow filtering mode.

Referring to the drawings in general, and to FIG. 1 in particular, shown therein and designated by the general reference numeral 10 is a filtering apparatus, which includes a vessel 12, an upper conduit assembly 14, a lower conduit assembly 16, a bed of positively buoyant ("floating") particulate 18, a bed of negatively buoyant ("sinking") particulate 20, and a drain conduit assembly 22. As shown in FIGS. 2 and 3, the filtering apparatus 10 typically includes a pump 24 for urging liquid through the vessel 12 and a drain plug or drain valve 26 for opening and closing the drain conduit assembly 22.

As illustrated in FIG. 1, the vessel 12 has an upper end 28, a lower end 30 and substantially cylindrical tubular side walls 32 to define an interior chamber 34. However, the vessel 12 may be any conventional receptacle capable of containing liquid in a substantially fluid-tight manner. Thus, the vessel 12 may be constructed in numerous shapes and from a variety of materials. Further, the vessel 12 may be constructed in a wide variety of sizes to cover a broad range of liquid capacities. For example, the vessel 12 may be quite small when adapted for use in a one- or two-gallon aquarium, but may be relatively large when utilized in a half-acre ornamental pond.

The upper conduit assembly 14 includes an upper pipe 36a, an upper washer bushing 38a, an upper elbow 40a, an upper adapter 42a and a plurality of upper slotted tubes 44a. The upper pipe 36a extends through the side wall 32 of the vessel 12 and is connected to the upper elbow 40a. The upper elbow 40a is connected to the upper adapter 42a and, in turn, the upper slotted tubes 44a are mounted to the upper adapter 42a. It should be appreciated that the upper adapter 42a is constructed such that the interiors of the upper slotted tubes 44a are in fluid communication with the upper elbow 40a through the upper adapter 42a. Thus, the upper conduit assembly 14 provides fluid communication from outside the vessel 12 through the upper pipe 36a, the upper elbow 40a, the upper adapter 42a and the upper slotted tubes 44a to the interior of the vessel 12 at an upper area of the vessel 12.

The upper washer bushing 38a provides a fluid-tight seal between the upper pipe 36a and the side wall 32 of the vessel 12. It should be understood that any suitable sealing mechanism known in the art may be utilized in place of the upper washer bushing 38a to prevent leakage of fluid from the vessel 12 around the upper pipe 36a.

Each of the upper slotted tubes 44a extends from the upper adapter 42a in any suitable manner. Further, each upper slotted tube 44a has an inner end 46a connected to the upper adapter 42a and an outer end 48a, which is closed. Between the inner end 46a and the outer end 4a, each upper slotted tube 44a has a plurality of slots. One of the slots is designated by reference character 50a and is generally representative of the slots in the upper slotted tubes 44a.

The lower conduit assembly 16 has the same components as the upper conduit assembly 14. In the drawing figures, like numerals designate like components and an appended letter indicates the upper or lower conduit assembly 14 or 16 (appended letter "a" denotes "upper" and appended letter "b" denotes "lower").

It should be appreciated that the slots 50a of each upper slotted tube 44a extend partially around the tube 44a and are disposed generally toward the interior wall of the upper end 28 of the vessel 12. In similar fashion, the slots 50b of each lower slotted tube 44b extend partially around the tube 44b and are disposed generally toward the interior wall of the lower end 30 of the vessel 12.

The bed of positively buoyant particulate 18 contained in the vessel 12 may comprise a wide variety of materials. Positively buoyant polymeric beads are a preferred positively buoyant particulate. The beads may be solid, porous, hollow, air-filled, vacuum-filled, gas-filled, or any other bead which is positively buoyant in the liquid to be filtered. The size and shape of the positively buoyant particulate may be varied greatly as long as the positively buoyant particulate define a medium which is porous to a liquid 52 disposed in the vessel 12. However, the positively buoyant particulate should have dimensions such that it will neither pass through nor clog the slots 50a in the upper slotted tubes 44a.

Typically, the quantity of positively buoyant particulate utilized is adequate to provide a bed of positively buoyant particulate for the upper ten to thirty percent of the vessel 12. Of course, the amount of positively buoyant particulate used may be increased or decreased depending on the type of liquid 52 being filtered and the desired filtering results.

The bed of negatively buoyant particulate 20 contained in the vessel 12 may comprise a wide variety of negatively buoyant materials. Sand and gravel are preferred materials for the negatively buoyant particulate. Other materials which may be used for the negatively buoyant particulate include crushed rock, granules of charcoal or the like, stainless steel balls, stainless steel beads, metallic balls, metallic beads, glass beads, plastic beads, filled polymeric beads, glass balls, metallic balls coated with a polymeric material, metallic beads coated with a polymeric material, and polymeric beads filled with a suitable material such as calcium. The size and shape of the negatively buoyant particulate may be varied greatly as long as the negatively buoyant particulate define a medium which is porous to the liquid 52 being filtered. However, the negatively buoyant particulate should have dimensions such that it will neither pass through nor clog the slots 50b in the lower slotted tubes 44b.

Typically, the quantity of negatively buoyant particulate is adequate to provide a medium of porous material extending over the lower ten to thirty percent of the vessel 12. However, the amount of negatively buoyant particulate used may be increased or decreased depending on the type of liquid 52 being filtered and the desired filtering results.

The dimensions and quantities of positively buoyant particulate and negatively buoyant particulate affect the filtering efficiency and the throughput of the filtering apparatus 10. In general, small volumes of coarse particulate result in greater throughput but with fewer impurities removed from the liquid 52. Conversely, large quantities of fine particulate produce better filtration but reduced throughput or increased pumping requirements to push the liquid 52 through the filtering apparatus 10. Thus, the sizes and quantities of positively buoyant and negatively buoyant particulate should be selected according to the filtration characteristics desired.

The drain conduit assembly 22 is provided for use in cleaning the filtering apparatus 10. As shown in FIG. 1, the drain conduit assembly 22 includes a drain pipe 54 which extends through the side wall 32 of the vessel 12. As previously disclosed herein, the drain conduit assembly 22 also comprises the drain plug or drain valve 26 connected to the drain pipe 54 to close off the drain pipe 54 during operation of the filtering apparatus 10 and to open the drain pipe 54 during cleaning of the filtering apparatus 10.

Downward Flow Operation

With reference to FIG. 2, shown therein is the filtering apparatus 10 in downward flow filtering mode. The pump 24 forces unfiltered liquid into an upper area of the vessel 12 (direction arrows 56 and 58) and filtered liquid exits at a lower part of the vessel 12 (direction arrow 60). The unfiltered liquid enters the vessel 12 through the slots 50a of the upper slotted tubes 44a. Due to its buoyancy, the bed of positively buoyant particulate 18 is amassed throughout an upper portion of the vessel 12.

The downward flow of the liquid 52 opposes the movement of the bed of positively buoyant particulate 18, which has a strong bias for floating in the liquid 52. The opposing forces of the liquid flow and the particulate buoyancy produce a fluidized bed type of action, which may create a floc (not shown) below the aggregation of the bed of positively buoyant particulate 18.

After traveling through the bed of positively buoyant particulate 18, the liquid 52 continues downward to the bed of negatively buoyant particulate 20 (direction lines 62). The tendency of the bed of negatively buoyant particulate 20 to sink acts in concert with the flow of the liquid 52. Thus, the bed of negatively buoyant particulate 20 acts as a straining medium.

After being strained through the bed of negatively buoyant particulate 20, filtered liquid 52 enters the lower conduit assembly 16 through the slots 50b of the lower slotted tubes 44b and is discharged from the vessel 12 through the lower pipe 36b as indicated by direction arrow 60. The drain valve 26 is closed during downward flow operation of the filtering apparatus 10.

It should be appreciated that two types of filtering operations are performed by the filtering apparatus 10 in the mode of downward flow filtration. A fluidized bed type of filtration takes place in an upper portion of the vessel 12 and a straining bed type of filtration occurs in a lower portion of the vessel 12.

Typically, the pump 24 or any like device is provided to force the liquid through the filtering apparatus 10 under fluid pressure. However, it is within the scope and concept of the present invention to utilize the filtering apparatus 10 without the pump 24 in a downward flow system wherein the liquid 52 is gravity fed through the filtering apparatus 10.

Upward Flow Operation

Referring to FIG. 3, shown therein is the filtering apparatus 10 in an upward flow filtering mode. The pump 24 forces unfiltered liquid into a lower area of the vessel 12 (direction arrows 64 and 66) and filtered liquid exits at an upper part of the vessel 12 (direction arrow 68). The unfiltered liquid enters the vessel 12 through the slots Sob of the lower slotted tubes 44b. Due to its sinking characteristic, the bed of negatively buoyant particulate 20 is amassed throughout a lower portion of the vessel 12.

The upward flow of the liquid 52 is in opposition to the bed of negatively buoyant particulate 20, which has a bias for sinking in the liquid 52. The opposing forces of the liquid flow and the sinking of the bed of negatively buoyant particulate 20 produce a fluidized bed type of action, which may create a floc (not shown) above the bed of negatively buoyant particulate 20.

After traveling through the bed of negatively buoyant particulate 20, the liquid 52 continues upward to the positively buoyant particulate 18 (direction lines 70). The tendency of the bed of positively buoyant particulate 18 to float acts in concert with the flow of the liquid 52. Thus, the bed of positively buoyant particulate 18 acts as a straining medium with respect to the liquid 52.

After being strained through the bed of positively buoyant particulate 18, filtered liquid 52 enters the upper conduit assembly 14 through the slots 50a of the upper slotted tubes 44a and is discharged from the vessel 12 through the upper pipe 36a as indicated by direction arrow 68. Of course, the drain valve 26 is closed during upward flow operation of the filtering apparatus 10.

It should be appreciated that two types of filtering operations are performed by the filtering apparatus 10 in the mode of upward flow filtration. A fluidized bed type of filtration takes place in a lower portion of the vessel 12 and a straining bed type of filtration occurs in an upper portion of the vessel 12.

Cleaning the Filtering Apparatus

Figure 4:
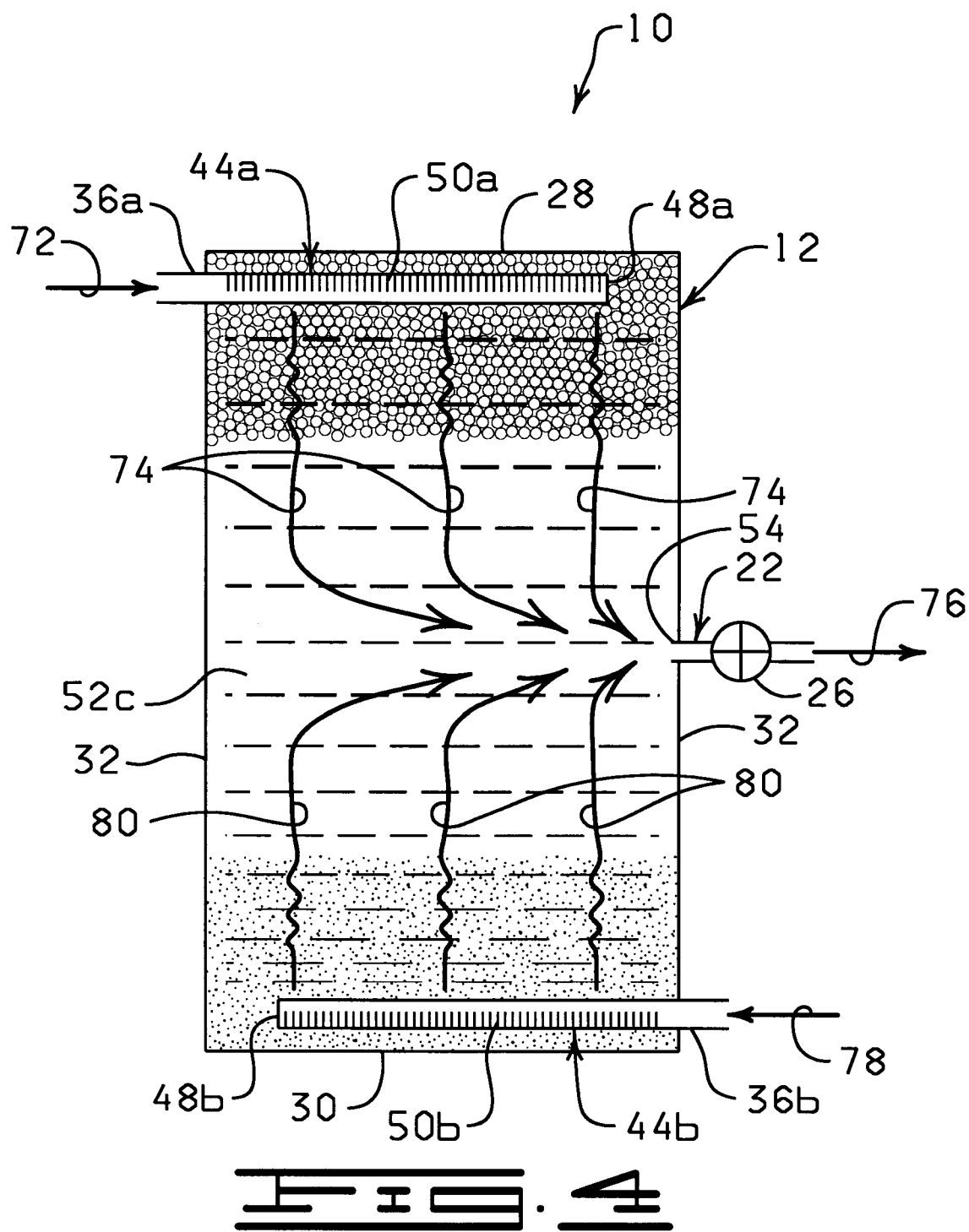
FIG. 4 is a diagrammatical view of the filtering apparatus of FIG. 1 operating in a backwash mode.

With reference to FIG. 4, shown therein is the filtering apparatus 10 in a backwash mode. The filtering apparatus 10 is cleaned by back-flushing liquid through the bed of positively buoyant particulate 18 and/or the bed of negatively buoyant particulate 20. It should be appreciated that the bed of particulate which acts as a straining medium traps most of the debris and particulate contaminants during the filtration process and should be cleaned periodically. However, either or both beds of particulates may be back-flushed from time to time as dictated by the amount of impurities in the liquid to be filtered.

Backwashing the bed of positively buoyant particulate 18 is performed by opening the drain valve 26 and forcing cleaning liquid 52c into the upper conduit assembly 14 as indicated by direction arrow 72. The cleaning liquid 52c enters the vessel 12 through the slots 50a of the upper slotted tubes 44a, passes through the bed of positively buoyant particulate 18, and travels within the vessel 12 as indicated by direction lines 74. Eventually, the cleaning liquid 52c enters the drain conduit assembly 22 and passes through the drain valve 26, as indicated by direction arrow 76. After its exit from the vessel 12, the cleaning liquid 52c, carrying debris and impurities flushed from the bed of positively buoyant particulate 18, is collected for appropriate disposal.

It should be appreciated that the filtering apparatus 10 may be provided with any conventional arrangement of valves, fittings, bushings, connections, vessels, containers, washers, filters, screens and the like for handling the cleaning liquid and debris and for converting between the filtering mode and the cleaning mode. Further, the cleaning liquid 52c may be water or may be any solution of cleaning fluids known in the art and suitable for the purpose disclosed herein.

Backwashing the bed of negatively buoyant particulate 20 is performed by opening the drain valve 26 and forcing cleaning liquid into the lower conduit assembly 16 as indicated by direction arrow 78. The cleaning liquid 52c enters the vessel 12 through the slots 50b of the lower slotted tubes 44b, passes through the bed of negatively buoyant particulate 20, and travels within the vessel 12 as indicated by direction lines 80. Eventually, the cleaning liquid 52c enters the drain pipe 54 and passes through the drain valve 26, as indicated by direction arrow 76. After its exit from the vessel 12, the cleaning liquid 52c, carrying debris and impurities flushed from the bed of negatively buoyant particulate 20, is collected for appropriate disposal.

Figure 5:
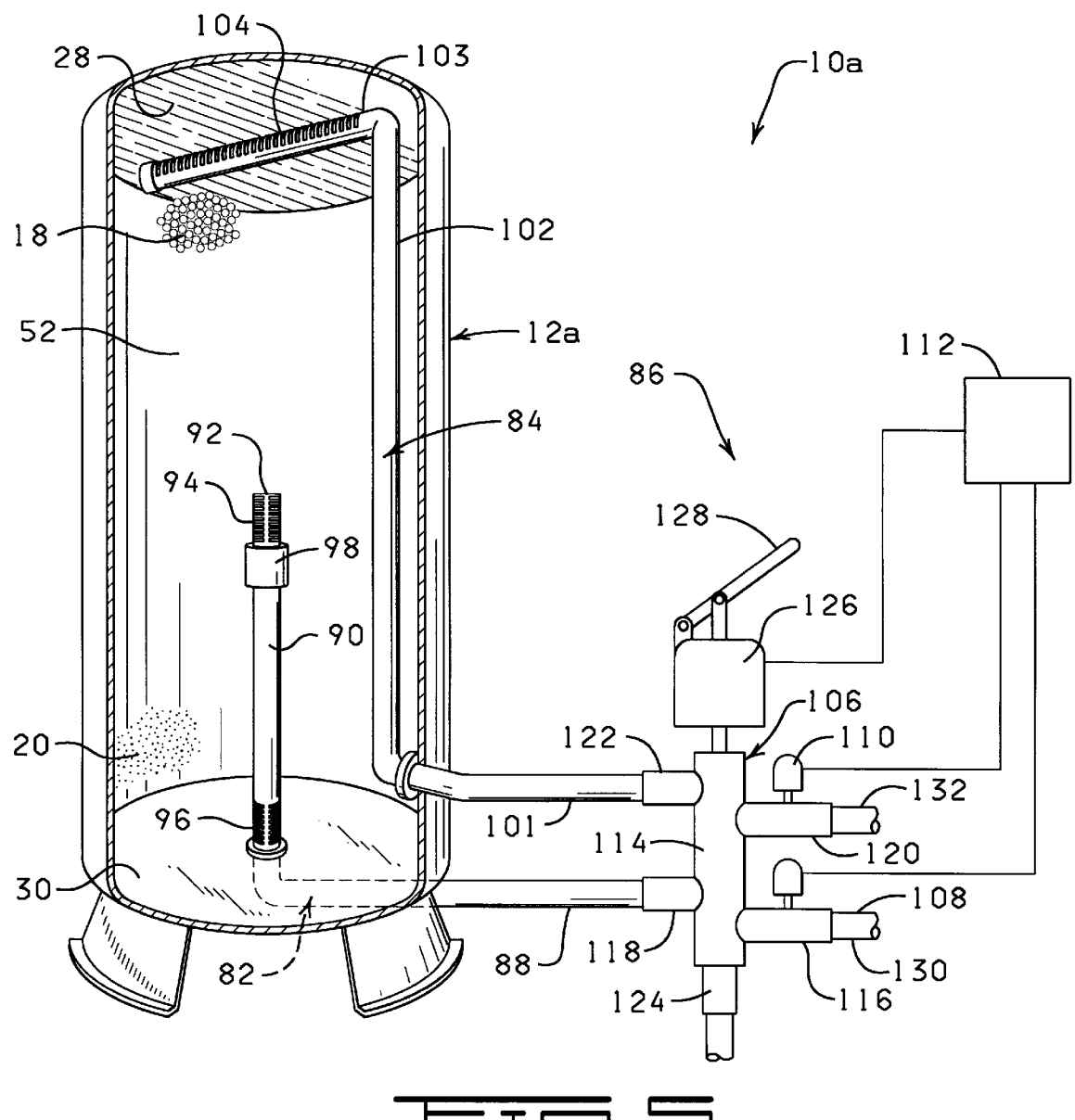
FIG. 5 is a partially diagrammatical view of another filtering apparatus constructed in accordance with the present invention.
Figure 6:
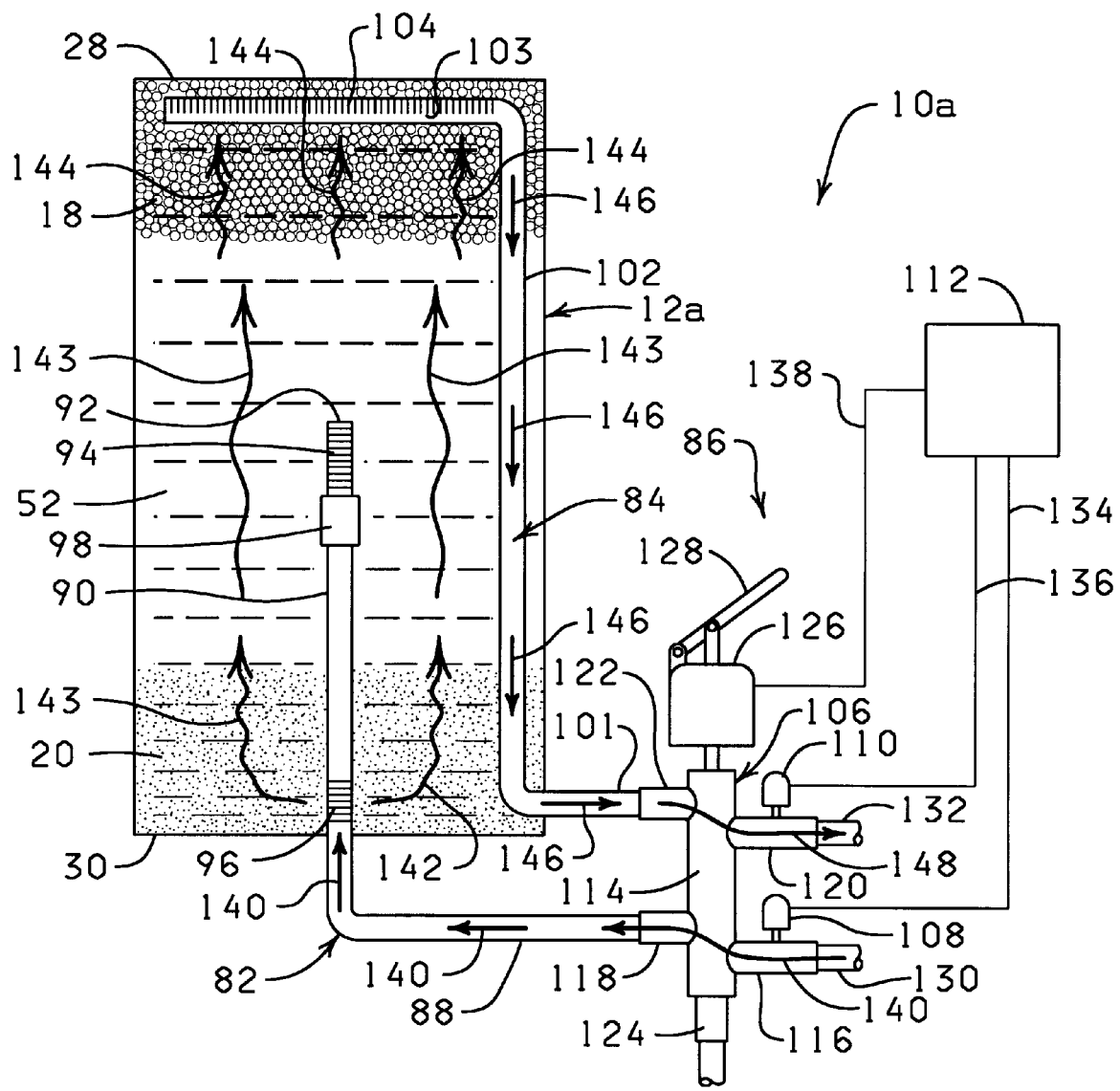
FIG. 6 is a diagrammatical view of the filtering apparatus of FIG. 5 operating in a filtering mode.
Figure 7:
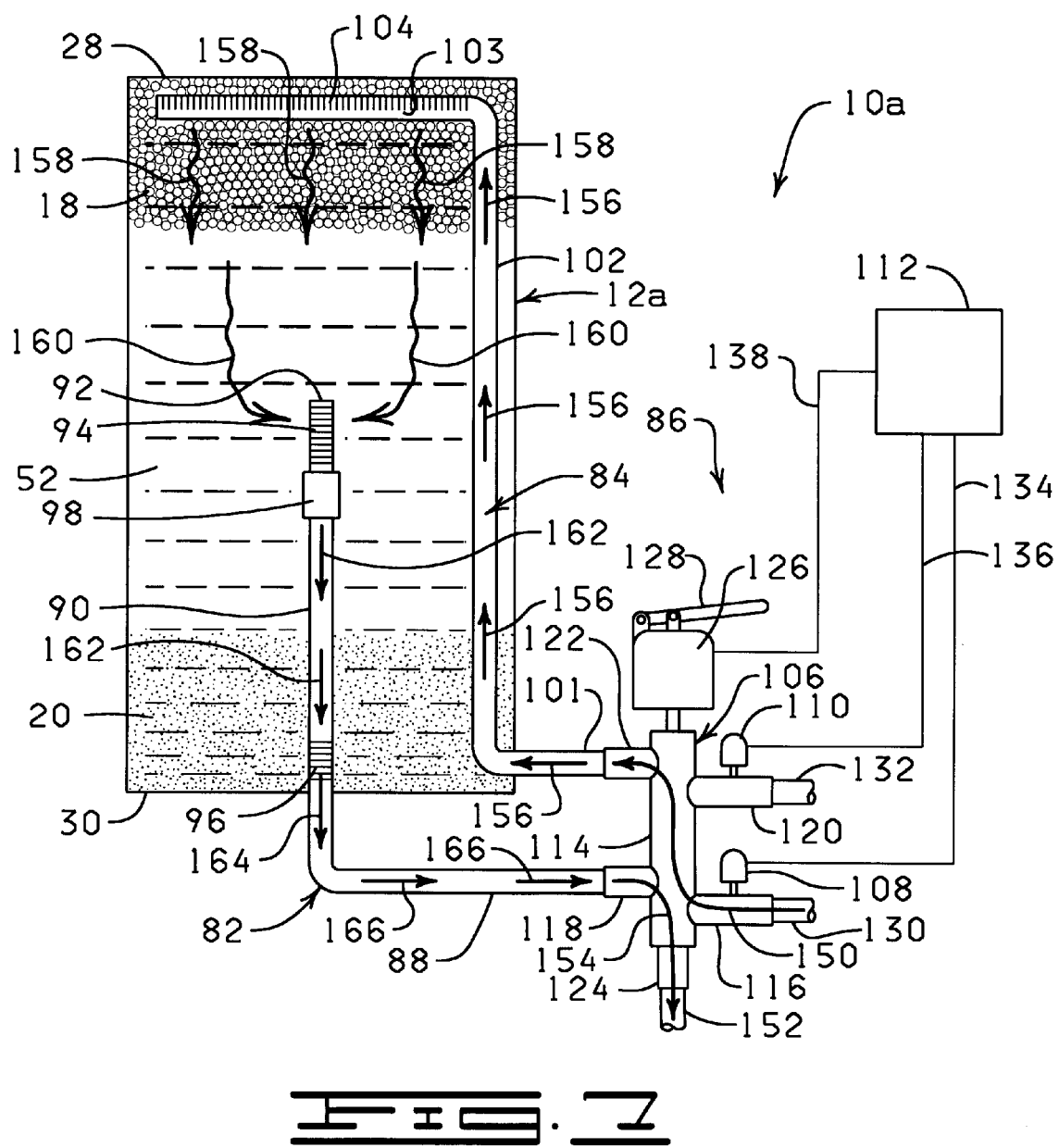
FIG. 7 is a diagrammatical view of the filtering apparatus of FIG. 5 operating in a backwash mode.

Embodiment of FIGS. 5–7

With reference to FIGS. 5–7, shown therein and designated by reference character 10a is an alternate embodiment of the filtering apparatus 10. The filtering apparatus 10a includes a vessel 12a, a bed of positively buoyant particulate 18, a bed of negatively buoyant particulate 20, a lower conduit assembly 82, an upper conduit assembly 84, and a backwash control system 86.

The vessel 12a is very similar to the vessel 12 disclosed hereinabove. Tanks which are suitable for use as the vessel 12a include the NAUTILUS FNS fiberglass DE product and the NAUTILUS stainless steel DE unit available from PUREX TRITON Swimming Pool Systems.

The lower conduit assembly 82 includes a horizontal conduit 88 having one end connected to the backwash control system 86 and the opposing end connected to a vertical conduit 90 extending into the interior of the vessel 12a. The vertical conduit 90 has a slotted or closed end 92 which is positioned between the bed of positively buoyant particulate 18 and the bed of negatively buoyant particulate 20 in the interior of the vessel 12a.

Further, the vertical conduit 90 has two slotted areas. A first slotted area 94 is at the end 92 of the vertical conduit 90 and a second slotted area 96 is positioned within the bed of negatively buoyant particulate 20 toward the lower end 30 of the vessel 12a.

The vertical conduit 90 is provided with a swing check valve 98, which is installed between the first slotted area 94 and the second slotted area 96. The swing check valve 98 may be located at any point between the first slotted area 94 and the second slotted area 96. However, the swing check valve 98 is preferably positioned proximate to the first slotted area 94. The swing check valve 98 is closed when fluid flow is in the direction from the horizontal conduit 88 toward the vertical conduit 90 and is open when fluid flow is from the end 92 of the vertical conduit 90 toward the swing check valve 98.

The upper conduit assembly 84 includes a first conduit 101, a second conduit 102, and a third conduit 103. The first conduit 101 is connected to the backwash control system 86 so as to establish fluid communication therebetween. The second conduit 102 extends from the first conduit 101 and functions as a riser within the vessel 12a.

The third conduit 103 of the upper conduit assembly 84 extends from the second conduit 102 and is positioned in an upper area of the bed of positively buoyant particulate 18 within the vessel 12a. The third conduit 103 is provided with at least one slotted area 104.

The backwash control system 86 includes a motorized slide valve 106, a pair of pressure sensors 108 and 110, and a backwash controller 112. The slide valve 106 has a valve body 114, a first port 116, a second port 118, a third port 120, a fourth port 122, a drain port 124, a motorized valve actuator 126, and a manually-operated valve lever 128.

As best seen in FIG. 6, the first port 116 of the slide valve 106 is connected to an intake line 130 and the second port 118 is connected to the horizontal conduit 88 of the lower conduit assembly 82. Under normal filtering operation, the slide valve 106 allows fluid flow from the first port 116 to the second port 118 and into the vessel 12a via the lower conduit assembly 82.

The third port 120 of the slide valve 106 is connected to a discharge line 132 and the fourth port 122 is connected to the first conduit 101 of the upper conduit assembly 84. Under normal filtering operation, the slide valve 106 allows fluid flow out of the vessel 12a through the upper conduit assembly 84, into the slide valve 106 through the fourth port 122, and out of the third port 120 into the discharge line 132.

One of the pressure sensors 108 is installed on the intake fluid pressure and the other pressure sensor 110 is located to provide an indication of the discharge fluid pressure. It should be appreciated that the pressure sensor 108 may be positioned at the intake line 130, the first port 116, the second port 118, the upper conduit assembly 82, or within the valve body 114 of the slide valve 106.

Similarly, the pressure sensor 110 may be located at the discharge line 132, the third port 120, the fourth port 122, the upper conduit assembly 84, or the within the valve body 114 of the slide valve 106. As indicated by the control lines 134 and 136, the pressure sensors 108 and 110 are operatively connected to the backwash controller 112.

A suitable slide valve 106 is commercially available as a 2-inch PVC slide valve kit, product number 26-1165, from PUREX TRITON Swimming Pool Systems. However, this particular slide valve is designed for use with sand filters and should be modified so that the flows for normal filtering operation and backwash mode are switched. Further, an assembly for the slide valve 106, the automatic backwash controller 112 and the pressure sensors 108 and 110 is commercially available from PUREX TRITON Swimming Pool Systems under the product number 26-1063. Again, modification to flip-flop the normal flow and backwash flow through the commercially available slide valve is required.

The backwash controller 112 comprises an appropriate control panel, circuitry, and electrical and mechanical components for switching the slide valve 106 between normal filtering mode and backwash mode. Typically, the backwash controller 112 includes logic to switch from normal filtering mode to backwash mode in response to a preset pressure rise differential of the two pressure sensors 108 and 110.

Alternatively, the backwash controller 112 may include a timer device such that the slide valve 106 may be switched from normal filtering mode to backwash mode at preselected time intervals. Further, the backwash controller 112 typically has a manual mode wherein an operator may switch the slide valve 106 by hand between normal filtering mode and backwash mode by manually actuating the valve lever 128.

It should be appreciated that the filtering apparatus 10a includes positively buoyant particulate and negatively buoyant particulate as disclosed hereinabove for the filtering apparatus 10. It should also be appreciated that the slotted areas 94, 96 and 104 may be provided in a wide variety of ways. That is, the slotted areas 94, 96 and 104 may be provided as shown in FIGS. 5 through 7, or in a spider-shaped arrangement as illustrated by FIG. 1, or in any other suitable shape, form or manner consistent with the purpose of the slotted areas 94, 96 and 104 as disclosed herein.

Of course, it is very desirable that the positively buoyant and negatively buoyant particulates be retained in the vessel 12a during normal filtering operation and during backwash. Thus, the slots of the slotted areas 94, 96 and 104 are sized and shaped to prevent the positively buoyant and negatively buoyant particulates from entering the lower conduit assembly 82 or upper conduit assembly 84.

Filtering Mode Shown in FIG. 6

With reference to FIG. 6, shown therein is the filtering apparatus 10a in a filtering mode. As indicated by direction arrows 140, liquid to be filtered travels from the intake line 130 through the slide valve 106 and into the lower conduit assembly 82. Because the swing check valve 98 is closed for fluid flow in this direction, the liquid passes through the slots of the slotted area 94 and into the bed of negatively buoyant particulate 20, as indicated by direction arrows 142. Under fluid flow pressure, the liquid 52 is forced up through the vessel 12a to the bed of positively buoyant particulate 18 (arrows 143). The liquid 52 then flows under pressure through the bed of positively buoyant particulate 18 and into the upper conduit assembly 84 by way of the slots of the slotted area 104 (direction arrows 144). Finally, filtered liquid 52 travels through the upper conduit assembly 84 (direction arrows 146) and through the slide valve 106 into the discharge line 132 (direction arrows 148).

It should be appreciated that filtering of the liquid 52 is accomplished by forcing the liquid 52 through both the bed of negatively buoyant particulate 20 and the bed of positively buoyant particulate 18. Further, it should be understood that at least one suitable pump and appropriate valves and controls (not shown) are provided to force the liquid 52 through the filtering apparatus 10a.

Backwash Mode Shown in FIG. 7

Referring to FIG. 7, shown therein is the filtering apparatus 10a operating in a backwash mode. Periodically, the filtering apparatus 10a should be switched to the backwash mode wherein flow through the vessel 12a is reversed in order to remove debris and particulate contaminants from the filtering apparatus 10a. To begin the backwash process, the backwash controller 112 operates the motorized valve actuator 126 via a control line 138 to switch the slide valve 106 to the backwash position. In the backwash position, the slide valve 106 diverts flow from the intake line 130 into the upper conduit assembly 84 (direction arrow 150) and routes flow from the lower conduit assembly 82 into the drain port 124 and a connected drain line 152 (direction arrow 154) whereby the lower conduit assembly 82 functions as a drainage or discharge conduit.

In backwash mode, liquid travels through the upper conduit assembly 84 (direction arrows 156) and exits the upper conduit assembly 84 through the slots of the slotted area 104. The liquid passes through the bed of positively buoyant particulate 18 to backwash debris from the bed of positively buoyant particulate 18 (direction arrows 158). The liquid 52 then enters the lower conduit assembly 82 through the slots of the slotted area 94 (direction arrows 160). The reversal of flow causes the swing check valve 98 to open and the liquid 52, carrying debris loosened from the bed of positively buoyant particulate 18, proceeds through the lower conduit assembly 82 (direction arrows 162).

As indicated by direction arrow 164, the liquid passes through the lower conduit assembly 82 without exiting through the slots of the slotted area 96. The liquid takes this path because there is far less resistance to flow through the lower conduit assembly 82 than through the slots of the slotted area 96 and into the bed of negatively buoyant particulate 20. However, the flow of the liquid past the slotted area 96 may serve to dislodge some debris which may collect in the slots of the slotted area 96 during the filtering operation.

Finally, the liquid and debris travel through the horizontal conduit 88 of the lower conduit assembly 82 (direction arrows 166) through the second port 118 and drain port 124, and into the drain line 152 (direction arrow 154). Typically, the drain line 152 is connected to a tank for collection of debris from the filtering apparatus 10a.

Switching to the backwash mode may be triggered through the backwash controller 112 by a pressure rise differential from the pressure sensors 108 and 110, or by a preset time interval through a timer of the backwash controller, or by hand operation of the valve lever 128. Return to the filtering mode may be initiated by the backwash controller 112 in response to a pressure drop differential from the pressure sensors 108 and 110, or by a preset time interval through the timer of the backwash controller 112, or by hand operation of the valve lever 128.

Embodiment of FIGS. 8–12

Referring now to FIGS. 8–12, shown therein is another embodiment of a filtering apparatus 10b. The filtering apparatus 10b includes a vessel 12b for housing a bed of positively buoyant particulate 18 and a bed of negatively buoyant particulate 20 in a manner identical to that described above. The vessel 12b is characterized as having an upper end 28b and a lower end 30b. The filtering apparatus 10b further includes a lower conduit assembly 240, an upper conduit assembly 242, and a backwash control system 86b (FIGS. 9–12).

It should be noted that the vessel 12b is similar to the vessels 12 and 12a described above, except as noted below, and the backwash control system 86b is identical in construction to the backwash control system 86 described above. Thus, for the sake of brevity, a detailed discussion of such components will not be repeated herein in reference to the filtering apparatus 10b. However, in the drawings, like numerals will designate like components with the exception that an appended letter "b" is used to denote that such components are employed in the filtering apparatus 10b.

The lower conduit assembly 240 includes a primary conduit 244, a pair of lateral conduits 246a and 246b, and a discharge conduit 248. The primary conduit 244 has one end connected to the second port 118b of the backwash control system 86b, as shown in FIGS. 9–12, and the other end disposed within the vessel 12b proximate the lower end 30b thereof.

The lateral conduits 246a and 246b each have an inlet end connected to the primary conduit 244 and extend outwardly from the vessel 12b, as shown. As shown in FIGS. 9–12, a valve 256a is interposed in the lateral conduit 246a, and a valve 256b is interposed in the lateral conduit 246b. Each lateral conduit 246a and 246b has a slotted area 254a and 254b, respectively, positioned within the bed of negatively buoyant particulate 20. The extended ends of the lateral conduits 246a and 246b can be connected to a storage tank (not shown) used for collecting fluid and particulate contaminants backwashed from the filtering apparatus 10b.

A check valve 258 is interposed between the primary conduit 244 and the lateral conduit 246a, and a check valve 260 is interposed between the primary conduit 244 and the lateral conduit 246b. The check valves 258 and 260 are directionally positioned to allow fluid to pass through the check valves 258 and 260 as fluid flows in a direction from the primary conduit 244 to the lateral conduits 246a and 246b.

The discharge conduit 248 has a main tube 262, which is connected to the primary conduit 244 so as to establish fluid communication therebetween, and a pair of branch tubes 264a and 264b. Each branch tube 264a and 264b has a slotted area 266a and 266b, respectively. The discharge conduit 248 is supported within the vessel 12b so that the slotted areas 266a and 266b are positioned between the bed of positively buoyant particulate 18 and the bed of negatively buoyant particulate 20 when the filtering apparatus 12b is in operation. A check valve 268 is interposed between the main tube 262 of the discharge conduit 248 and the primary conduit 244. The check valve 268 is directionally positioned to allow fluid to pass through the check valve 268 as fluid flows in a direction from the discharge conduit 248 to the primary conduit 244.

Figure 8:
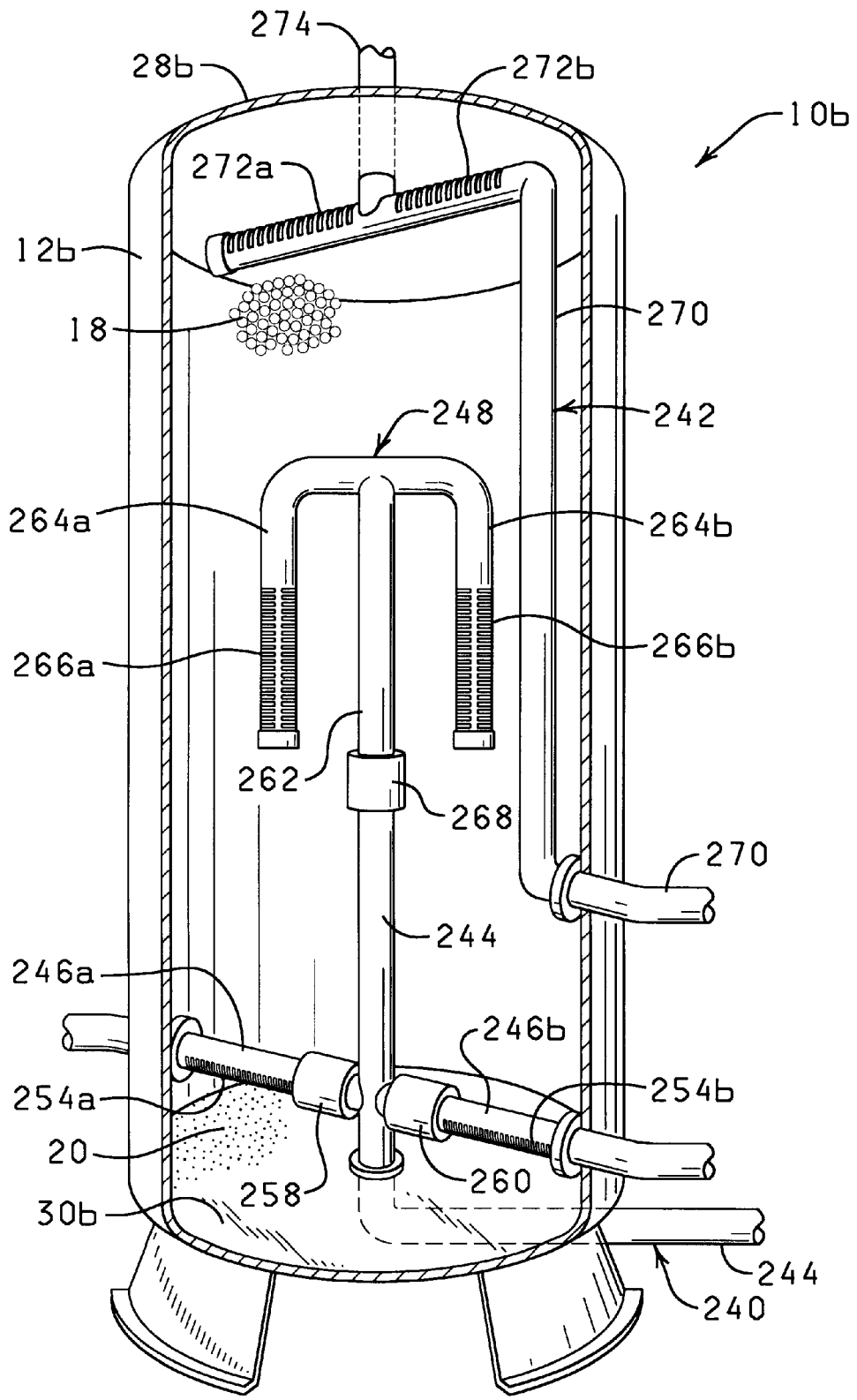
FIG. 8 is a partially diagrammatical view of another filtering apparatus constructed in accordance with the present invention.

The upper conduit assembly 242 includes a primary conduit 270 having one end connected to the fourth port 122b of the backwash control system 86b so as to establish fluid communication therebetween and another end extended into the vessel 12b proximate the upper end 28b thereof, as substantially shown in FIG. 8. The primary conduit 270 is provided with a pair of slotted areas 272a and 272b which are positioned within the bed of positively buoyant particulate 18. The upper conduit assembly 242 further includes a vent conduit 274 which extends upwardly from the primary conduit 270 through the upper end 28b of the vessel 12b. The vent conduit 274 is provided with a manual relief valve 276, as illustrated in FIGS. 9–12, for permitting the selective release of gaseous fluids trapped in the upper end 28b of the vessel 12b.

Filtering Mode

With reference to FIG. 9, shown therein is the filtering apparatus 10b in a filtering mode. In the filtering mode, the slide valve 106b is positioned to permit contaminated liquid to pass from the intake line 130b into the primary conduit 244. It should be noted that in the filtering mode, the valves 256a and 256b of the lateral conduits 246a and 246b, respectively, are closed. With the valves 256a and 256b closed and the check valve 268 forced into a closed position, the liquid is caused to pass into the lateral conduits 246a and 246b, through the slots of the slotted areas 254a and 254b, and into the bed of negatively buoyant particulate 20. Under pressure, the liquid is forced up through the bed of negatively buoyant particulate 20 whereby the upwardly moving liquid creates a fluidized bed in which the liquid undergoes a nitrification process.

Upon passing through the bed of negatively buoyant particulate 20, the liquid travels up through the vessel 12b and through the bed of positively buoyant particulate 18. Due to the upward movement of the liquid and the positive buoyancy of the bed of positively buoyant particulate 18, the particulate which make up the bed of positively buoyant particulate 18 are compacted so as to create a filter bed which strains particulate contaminants from the liquid. The strained liquid then passes into the slots of the slotted areas 272a and 272b of the primary conduit 270 of the upper conduit assembly 242, through the primary conduit 270, and through the slide valve 106b into the discharge line 132b.

Backwash Mode

Referring to FIG. 10, shown therein is the filtering apparatus 10b operating in a primary backwash mode. It should be appreciated that the filtering apparatus 10b should be backwashed periodically to remove particulate contaminants trapped in the filtering apparatus 10b during the filtering mode, and more particularly, to remove particulate contaminants collected by the bed of positively buoyant particulates 18. To initiate the backwash mode, the backwash controller 112b signals the motorized valve actuator 126b to move the slide valve 106b to the backwash position. In the backwash position, the slide valve 106b diverts liquid flow from the intake line 130b into the primary conduit 270 of the upper conduit assembly 242. Liquid is forced through the primary conduit 270 and through the slots of the slotted areas 272a and 272b. The liquid passes down through the bed of positively buoyant particulate 18 thereby flushing the particulate contaminants from the bed of positively buoyant particulate 18.

Upon passing through the bed of positively buoyant particulate 18, the liquid takes the path of least resistance and thus passes into the slots of the slotted areas 266a and 266b of the discharge conduit 248. It will be appreciated that because the slotted areas 266a and 266b are positioned below the bed of positively buoyant particulate 18 and above the bed of negatively buoyant particulate 20, the backwashing liquid is circulated through the vessel 12b so as to flush or rinse the bed of positively buoyant particulate 18 while maintaining the bed of negatively buoyant particulate 20 in a relatively undisturbed state so as not to remove the bacteria growth from the surface of the particulate making up the bed of negatively buoyant particulate 20.

Upon entering the discharge conduit 248, the liquid passes through the check valve 268, through the primary conduit 244, and into the drain line 152b. As mentioned above, the drain line 152b will typically be connected to a tank (not shown) where the particulate contaminants are collected for disposal.

As described above, initiation of the backwash mode may be triggered by pressure differential between the pressure sensors 108b and 10b caused by the filtering apparatus 10b becoming clogged with particulate contaminants, at a preset time interval, or by manual operation of the valve lever 128b. Conversely, a return to the filtering mode may be initiated by a drop in the differential pressure between the pressure sensors 108b and 110b by a preset time interval, or by manual operation of the valve lever 128b.

While the primary backwash mode described above is effective for removing particulate contaminants from the bed of positively buoyant particulate 18, it may be desirable to periodically rinse the bed of negatively buoyant particulate 20 and to power flush the lateral conduits 246a and 246b. FIG. 11 illustrates a secondary backwash mode. The secondary backwash mode is carried out in a manner identical to the primary backwash mode described above in reference to FIG. 10, with the exception that the valves 256a and 256b of the lateral conduits 246a and 246b, respectively, are open. As such, upon the liquid passing through the bed of positively buoyant particulate 18 to backwash debris from the bed of positively buoyant particulate 18, a portion of the liquid is permitted to pass through the bed of negatively buoyant particulate 20 into the slots of the slotted areas 254a and 254b of the lateral conduits 246a and 246b and out of the vessel 12b via the lateral conduits 246a and 246b, which as described above can be connected to a tank (not shown) for collecting the particulate contaminants for later disposal.

During the secondary backwash mode, the flow of liquid into the slotted areas 254a and 254b of the lateral conduits 246a and 246b, respectively, may serve to dislodge some of the debris which may have collected in the slots of the slotted areas 254a and 254b during the filtering mode. However, it should be appreciated that the lateral conduits 246a and 246b may need to be more thoroughly flushed to remove accumulated particulate contaminants. To this end, FIG. 12 illustrates a lateral conduit flushing mode. The lateral conduit flushing mode is carried out in a manner identical to the filtering mode described above in reference to FIG. 9 with the exception that the valves 256a and 256b of the lateral conduits 246a and 246b, respectively, are opened. Thus, a significant portion of the liquid passed into the primary conduit 244 and into the lateral conduits 246a and 246b will flow past the slotted areas 254a and 254b without passing into the bed of negatively buoyant particulate 20. The increased flow rate of liquid through the lateral conduits 246a and 246b will act to loosen particulate matter which has accumulated in the lateral conduits 246a and 246b and carry such matter out of the lateral conduits 246a and 246b.

Changes may be made in the combinations, operations and arrangements of the various parts and elements described herein without departing from the spirit and scope of the invention as defined in the following claims.

What is claimed is:

1. A filtering apparatus comprising:
   a vessel having an upper end and a lower end;
   a bed of negatively buoyant particulate positioned in the lower end of the vessel;
   a bed of positively buoyant particulate suspendable in the upper end of the vessel in a spaced apart relationship from the bed of negatively buoyant particulate;
   means for introducing contaminated liquid into the lower end of the vessel in a filtering mode wherein the contaminated liquid is caused to pass through the bed of negatively buoyant particulate and through the bed of positively buoyant particulate to produce a filtered liquid;
   means for discharging the filtered liquid from the vessel in the filtering mode;
   means for introducing a backwash liquid into the vessel in a backwash mode wherein the backwash liquid is passed through the bed of positively buoyant particulate to flush particulate contaminants therefrom; and
   means for discharging the backwash liquid from the vessel at a location between the bed of negatively buoyant particulate and the bed of positively buoyant particulate.

2. The filtering apparatus of claim 1 wherein the bed of negatively buoyant particulate occupies a volume of about ten to thirty percent of the vessel and wherein the bed of positively buoyant particulate occupies a volume of about ten to thirty percent of the vessel.

3. The filtering apparatus of claim 1 wherein the means for introducing the contaminated fluid into the vessel comprises:

a primary conduit extending into the vessel; and a pair of laterally extending conduits connected to the primary conduit so as to establish fluid communication therewith in the filtering mode, each laterally extending conduit having a slotted area positioned within the bed of negatively buoyant particulate.

4. The filtering apparatus of claim 3 wherein each of the lateral conduits has one end connected to the primary conduit and is extended from the vessel, and wherein the filtering apparatus further comprises:

a valve interposed in each of the lateral conduits on the exterior side of the vessel.

5. The filtering apparatus of claim 3 wherein the means for discharging the backwash fluid from the vessel comprises:

a discharge conduit connected to the primary conduit so as to establish fluid communication therewith in the backwash mode, the conduit having a slotted area positioned between the bed of negatively buoyant particulate and the bed of positively buoyant particulate.

6. A filtering apparatus comprising:

a vessel having an upper end and a lower end;

a bed of negatively buoyant particulate positioned in the lower end of the vessel;

a bed of positively buoyant particulate suspendable in the upper end of the vessel in a spaced apart relationship from the bed of negatively buoyant particulate;

means for introducing contaminated liquid into the upper end of the vessel in a filtering mode wherein the contaminated liquid is caused to pass through the bed of positively buoyant particulate and through the bed of negatively buoyant particulate to produce a filtered fluid;

means for discharging the filtered liquid from the vessel in the filtering mode;

means for introducing a backwash liquid into the vessel in a backwash mode wherein the backwash liquid is passed through the bed of negatively buoyant particulate to flush particulate contaminants therefrom; and means for discharging the backwash liquid from the vessel at a location between the bed of negatively buoyant particulate and the bed of positively buoyant particulate.

7. The filtering apparatus of claim 6 wherein the bed of negatively buoyant particulate occupies a volume of about ten to thirty percent of the vessel and wherein the bed of positively buoyant particulate occupies a volume of about ten to thirty percent of the vessel.

\* \* \* \* \*

UNITED STATES PATENT AND TRADEMARK OFFICE
CERTIFICATE OF CORRECTION

PATENT NO. : 5,932,092
DATED : August 3, 1999
INVENTOR(S) : William D. Hawk and Gary D. Cryer It is certified that error appears in the above-identified patent and that said Letters Patent is hereby corrected as shown below:

Col. 3, line 24, delete "4a" and substitute therefor --48a--;

Col. 5, line 24, delete "Sob" and substitute therefor --50b--;

Col. 6: line 25, after "liquid" and before "into", insert --52c--;

Col. 7, line 45, delete "upper" and substitute therefor --lower--;

Col. 8: line 34, after "liquid" and before "to", insert --52--;
line 37, after "liquid" and before "passes", insert --52--;

Col. 9: line 6, after "liquid" and before "travels", insert --52--;
line 18, after "liquid" and before "passes", insert --52--;
line 20, after "liquid" and before "takes", insert --52--;
line 24, after "liquid" and before "past", insert --52--;
line 28, after "liquid" and before "and", insert --52--;
line 38, delete "controller," and substitute therefor --controller 112,--;

UNITED STATES PATENT AND TRADEMARK OFFICE
CERTIFICATE OF CORRECTION

PATENT NO. : 5,932,092
DATED : August 3, 1999
INVENTOR(S) : William D. Hawk and Gary D. Cryer It is certified that error appears in the above-identified patent and that said Letters Patent is hereby corrected as shown below:

Col. 11, line 59, delete "10$b$" and substitute therefor --110$b$--;

Col. 13, line 22 (line 2 of claim 5), delete "fluid" and substitute therefor --liquid--; and Col. 14, line 11 (line 13 of claim 6), delete "fluid;" and substitute therefor --liquid;--.

Signed and Sealed this

Sixth Day of June, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

Page 3 of 5

PATENT NO.    :    5,932,092

DATED    :    August 3, 1999

INVENTOR(S)    :    William D. Hawk and Gary D. Cryer

It is certified that error appears in the above-identified patent and that said Letters Patent is hereby corrected as shown below:

In the Drawings:

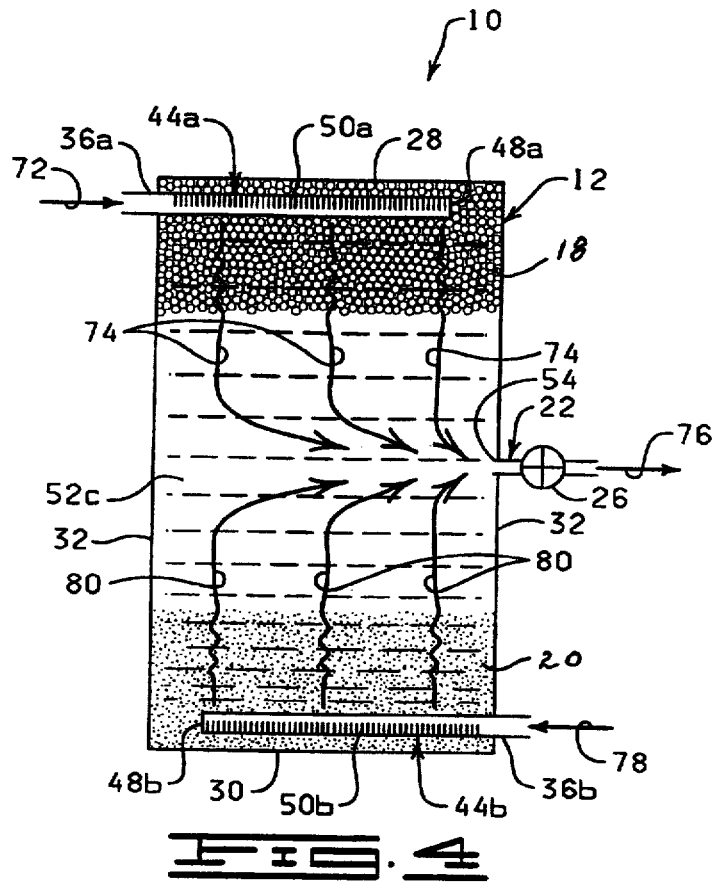

FIG. 4, insert the numeral --18-- to designate the positively buoyant particulate; and insert the numeral --20-- to designate the negatively buoyant particulate.

UNITED STATES PATENT AND TRADEMARK OFFICE
CERTIFICATE OF CORRECTION

PATENT NO.   : 5,932,092

DATED        : August 3, 1999

INVENTOR(S)  : William D. Hawk and Gary D. Cryer

It is certified that error appears in the above-identified patent and that said Letters Patent is hereby corrected as shown below:

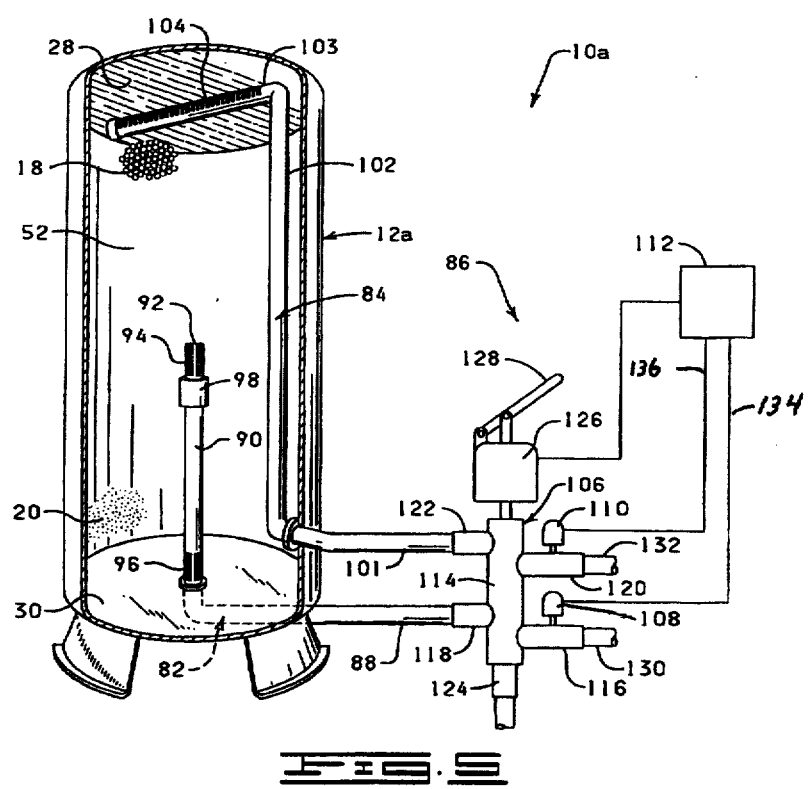

FIG. 5: please change the leadline to designate the pressure sensor 108, not the intake line; and add the numerals --134-- and --136-- to designate the control lines.

UNITED STATES PATENT AND TRADEMARK OFFICE
CERTIFICATE OF CORRECTION

PATENT NO. : 5,932,092

DATED : August 3, 1999

INVENTOR(S) : William D. Hawk and Gary D. Cryer

It is certified that error appears in the above-identified patent and that said Letters Patent is hereby corrected as shown below:

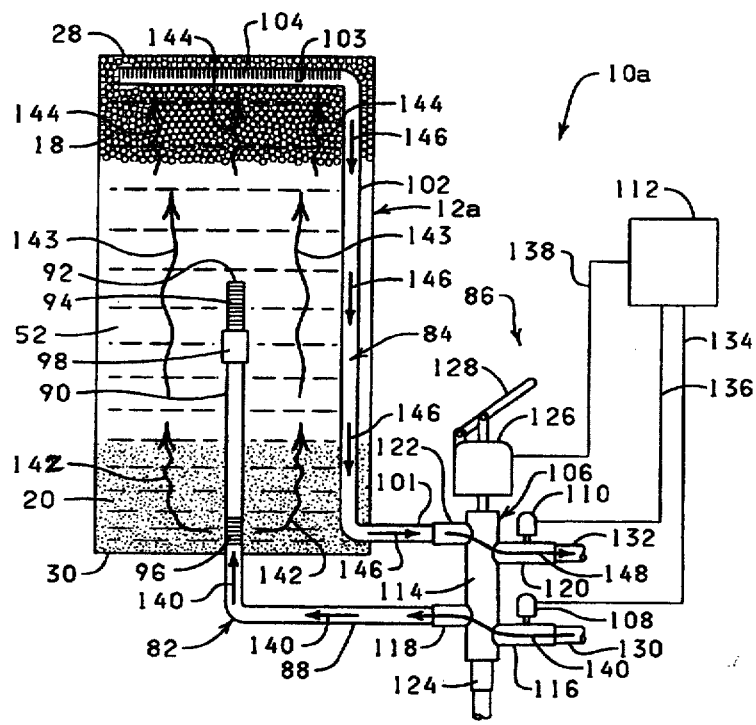

FIG. 6, please delete the numeral "143", designating the fluid flow direction into the bed of negatively buoyant particulate 20, and substitute therefor --142--.